United States Patent
Saegusa

[11] Patent Number: 5,837,209
[45] Date of Patent: Nov. 17, 1998

[54] TIN OXIDE WHISKER

[75] Inventor: Kunio Saegusa, Tsukuba-gun, Japan

[73] Assignee: Sumitomo Chemical Company, Limited, Osaka, Japan

[21] Appl. No.: 630,607

[22] Filed: Apr. 10, 1996

[30] Foreign Application Priority Data

Apr. 10, 1995 [JP] Japan .................................. 7-110089

[51] Int. Cl.⁶ .................................................. C01G 19/00
[52] U.S. Cl. ............................................. 423/89; 117/75
[58] Field of Search ............................. 117/75, 87, 921; 423/89

[56] References Cited

U.S. PATENT DOCUMENTS

| | | | |
|---|---|---|---|
| 3,846,527 | 11/1974 | Winter et al. | 264/63 |
| 5,330,833 | 7/1994 | Yamashita et al. | 428/364 |
| 5,484,694 | 1/1996 | LeLental et al. | 430/530 |

FOREIGN PATENT DOCUMENTS 5-17145  1/1993  Japan .............................. C01G 19/02

OTHER PUBLICATIONS

Nihon Kagakukaishi, pp. 1893–1896—1974.
Iwanaga et al, Morphology of $SnO_2$ Whishers, Mar. 15, 1987, pp. 602–605.
Nagasawa et al, Vapor Reaction Growth of $SnO_2$ Single Crystals and Their Properties, vol. 4, No. 3, Mar. 1965 pp. 195–202.

*Primary Examiner*—Felisa Garrett
*Attorney, Agent, or Firm*—Sughrue, Mion, Zinn, Macpeak & Seas, PLLC

[57] ABSTRACT

Tin oxide whisker having a length of 0.1 to 100 μm, a thickness of 0.005 to 5 μm, and a ratio of the length to the thickness of at least 5, containing optionally a dopant such as antimony and bismuth, which contains no or few agglomerates and has excellent dispersibility in a matrix component.

4 Claims, 4 Drawing Sheets

TIN OXIDE WHISKER

BACKGROUND OF THE INVENTION

1. Field of the Invention

The present invention relates to tin oxide whisker and a method for producing the same. In particular, the present invention relates to tin oxide whisker which is used in a dispersed state such as a filler or a pigment, or used as a raw material in the production of a single crystal, or flame spraying.

2. Description of the Related Art

Hitherto, tin oxide powder is produced by calcining powder of a tin compound such as tin hydroxide, carbonate, oxalate or nitrate. The tin oxide powder is a transparent or white oxide, and used as a corrosion resistant material or an electrically conductive material. To increase the electrical conductivity, 2 to 20 wt. % of antimony or other dopant metal is doped in the tin oxide powder.

However, the tin oxide powder prepared by such conventional method consists of irregular shape particles, and are strongly agglomerated in general. When such tin oxide powder is used as a filler or a pigment, it is very difficult to disperse the tin oxide powder in a matrix component.

It is known that, when an electrically conductive material is dispersed in a matrix component, electrical conductivity of a produced composite depends on a particle shape and dispersibility of the conductive material, and that a needle shape electrically conductive material having good dispersibility can impart electrical conductivity to the composite effectively. That is, the same level electrical conductivity is achieved by the use of the needle shape material having good dispersibility in an amount which is about half an amount of the spherical material.

This may be because particles of the needle shape electrically conductive material tangle each other to form effective conducting paths. Accordingly, the needle shape electrically conductive materials, for example, tin oxide whisker attract attention.

Conventionally, the tin oxide whisker is produced by calcining tin oxide or metal tin under low oxygen partial pressure to form gaseous SnO and then synthesizing $SnO_2$ whisker (see, for example, H. Iawanaga et al., J. Crystal Growth, 83, 602–605 (1987)). But, the tin oxide whisker produced by such method has a thickness of 0.2 to 5 μm and a length of 1 to 2 mm. These sizes are too large for use as a filler.

Further the production steps in the above method are complicated and difficult to control, and the production is greatly influenced by apparatus parameters. In addition, this method is not attractive in the industrial production of the tin oxide whisker since a raw material and a production apparatus are costly.

SUMMARY OF THE INVENTION

An object of the present invention is to provide novel tin oxide whisker which has a specific size and is excellent in electrical conductivity and dispersibility in a matrix component.

Another object of the present invention is to provide a method for producing novel tin oxide whisker.

According to a first aspect of the present invention, there is provided tin oxide whisker having a length of 0.1 to 100 μm, a thickness of 0.005 to 5 μm, and a ratio of the length to the thickness of at least 5.

According to a second aspect of the present invention, there is provided a method for producing tin oxide whisker which has a length of 0.1 to 100 μm, a thickness of 0.005 to 5 μm, and a ratio of the length to the thickness of at least 5, comprising heating at least one tin compound selected from the group consisting of tin oxide and tin compounds which can be converted to tin oxide at a temperature of at least 600° C. in the presence of at least one halogen-containing gas selected from the group consisting of halogen gases and hydrogen halide gases.

According to a third aspect of the present invention, there is provided a method for producing electrically conductive tin oxide whisker which has a length of 01 to 100 μm, a thickness of 0.005 to 5 μm, and a ratio of the length to the thickness of at least 5 and contains 1 to 20 wt. % (in terms of an oxide) of at least one dopant selected from the group consisting of antimony and bismuth, comprising heating at least one tin compound selected from the group consisting of tin oxide and tin compounds which can be converted to tin oxide, and at least one dopant source selected from the group consisting of antimony oxide, antimony compounds which can be converted to antimony oxide, bismuth oxide and bismuth compounds which can be converted to bismuth oxide at a temperature of at least 600° C. in the presence of at least one halogen-containing gas selected from the group consisting of halogen gases and hydrogen halide gases.

DETAILED DESCRIPTION OF THE INVENTION

Figure 1:
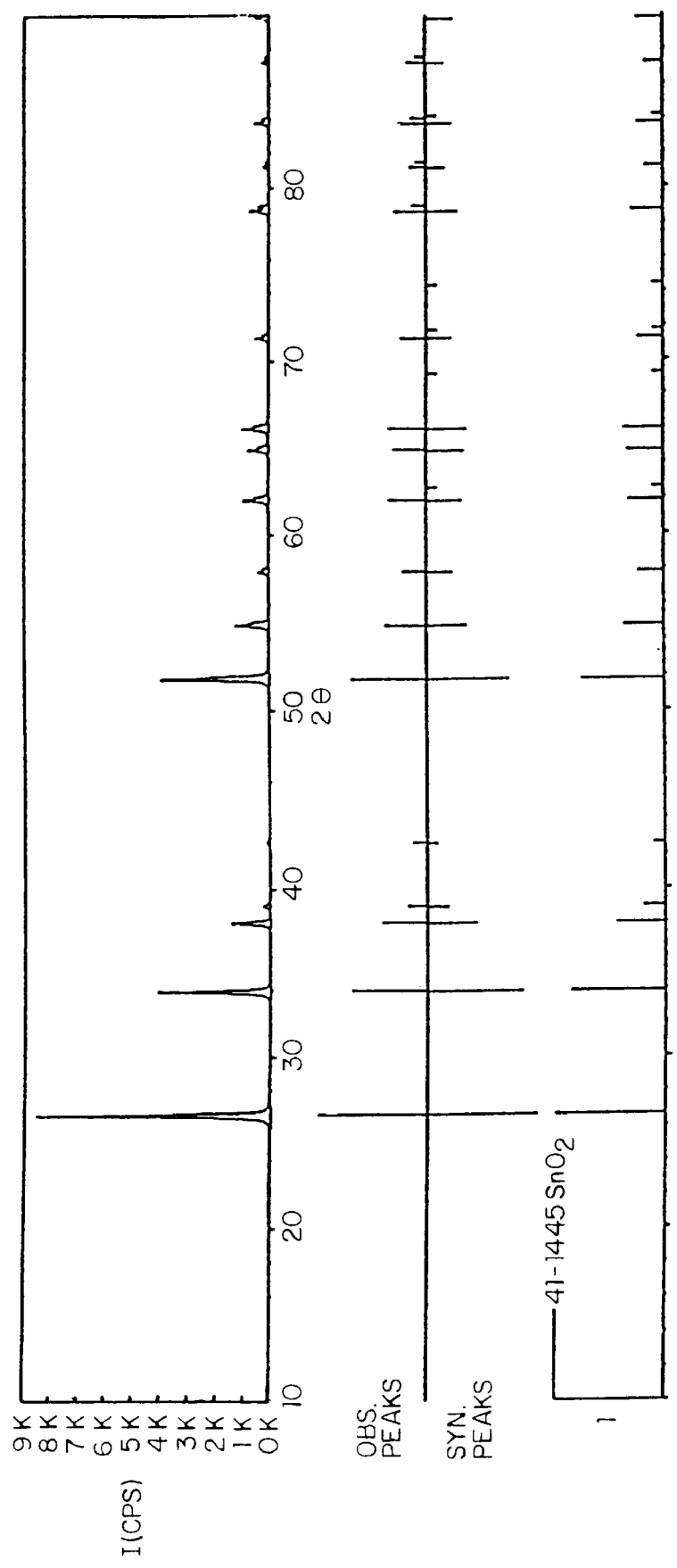
FIG. 1 is an X-ray diffraction pattern of tin oxide whisker produced in Example 1.

The tin oxide whisker of the present invention has a length (L) of 0.1 to 100 μm, preferably 0.5 to 50 μm, a thickness (or diameter) (D) of 0.005 to 5 μm, preferably from 0.01 to 1 μm, and a ratio of a length to a thickness (L/D) (hereinafter referred to as "aspect ratio") of at least 5, preferably at least 10. Preferably, the whisker grows in the C-axis direction of the crystal.

When the length is shorter than 0.1 μm, the tin oxide whisker cannot impart the electrical conductivity to a composite containing the whisker advantageously. When the length is longer than 100 μm, it is difficult to disperse the whisker in a matrix component such as plastics, paints, and so on. When the aspect ratio is less than 5, the whisker cannot impart the electric conductivity to the composite sufficiently.

A kind and a preparation method of the tin compound which can be converted to tin oxide are not limited, and any of conventionally used compound may be used. For example, tin oxide powder or tin oxide precursor powder which is prepared by a liquid phase method, or tin oxide powder, tin oxide precursor powder or metal tin which is prepared by a gas phase or solid phase method may be used. Preferably, the tin compound which can be converted to tin oxide is in a powder form.

Examples of the tin oxide precursor are tin hydroxide, tin carbonate, tin nitrate, tin sulfate, tin acetate, tin oxalate, and so on. Specific examples of these compounds are metastannic acid, stannous carbonate, stannic carbonate, stannous nitrate, stannic nitrate, stannous sulfate, stannic sulfate, stannous acetate, stannic acetate, stannous oxalate, stannic oxalate, and precipitated materials obtained from these compounds by the liquid phase method.

Examples of the halogen gas to be used in the method of the present invention are fluorine gas, chlorine gas, bromine gas, and iodine gas. In view of costs and handling properties, the chlorine gas is preferred. Examples of the hydrogen halide gas are hydrogen fluoride gas, hydrogen chloride gas, hydrogen bromide gas, and hydrogen iodide gas. Again, in view of costs and handing properties, the hydrogen chloride gas is preferred.

A concentration of the halogen gas and/or the hydrogen halide gas is not limited. In view of the economical efficiency, a reaction rate, and so on, the concentration is preferably from 1 to 80 vol. %, more preferably from 10 to 80 vol. % based on the volume of the atmosphere gas. The rest of the atmosphere gas may be a diluent gas, an oxidative gas, and so on.

When the concentration of the halogen gas and/or the hydrogen halide gas is less than 1 vol. %, the reaction may proceed very slowly, and may require a long time. When this concentration exceeds 80 vol. %, a yield of the tin oxide whisker may decrease in some cases.

Preferably, the atmospheric gas contains an oxygen-containing oxidative gas. As the oxygen-containing oxidative gas, oxygen gas, air, steam, nitrogen oxide, and so on may be used. In the industrial production, oxygen, air and stream are preferred. A concentration of the oxygen-containing oxidative gas in the atmosphere gas is preferably from 1 to 90 vol. %, more preferably 5 to 50 vol. %. When the concentration of the oxidative gas is less than 1 vol. %, the reaction may proceed slowly, and a yield may decrease. When this concentration exceeds 90 vol. %, the reaction may proceed slowly.

A source of the atmosphere gas and a method for supplying the same are not limited. Any source and any method can be used, as long as the atmosphere gas can be intruded in a reaction system containing the raw material powder.

As a source of the atmosphere gas, a cylinder gas is used in general. The atmosphere gas containing the hydrogen halide or the halogen may be prepared from a halogen compound such as an ammonium halide. Further, a mixture of the raw material powder, for example, the tin oxide powder, and the halogen compound or a halogen-containing polymer is calcined in a furnace to form the atmosphere gas.

The halogen gas or the hydrogen halide is filled in the cylinder in a liquefied state in general. A source material which is used in a liquid state such as bromine or a source material which is used in a solid state such as iodine, or ammonium fluoride, ammonium chloride, ammonium bromide or ammonium iodide may be thermally decomposed to generate the hydrogen halide. Alternatively, a metal fluoride such as lithium fluoride, zinc fluoride, etc. is reacted with hydrogen chloride at an elevated temperature to generate hydrogen fluoride.

As a diluent gas for the halogen gas and/or the hydrogen halide gas in the atmosphere gas, inert gas such as nitrogen or argon, or the above described oxygen-containing oxidative gas (e.g. oxygen, steam or air) may be used.

A pressure of the atmosphere gas is not limited and arbitrarily selected from a pressure range used in the industrial method.

When a decomposition gas of, for example, an ammonium halide is used, deposition of a solid material in a calcination furnace may cause a trouble in operation. Therefore, it is preferred to supply the halogen or hydrogen halide gas directly in the furnace from the cylinder, and so on.

The atmosphere gas may be supplied batchwise or continuously.

According to the method of the present invention, since the raw material is calcined in the above atmosphere gas, the tin oxide whisker grows at sites where the raw material is present through the functions of the raw material powder and the atmosphere gas. Then, when the raw material is filled in a container and simply calcined in the atmosphere gas, the desired tin oxide whisker is obtained.

A calcination temperature depends on the intended size of the tin oxide whisker, the concentration of halogen or hydrogen halide gas in the atmosphere gas, or a calcination time, and is not limited. The calcination temperature is usually at least 600° C., preferably from 900° C. to 1500° C.

When the calcination temperature is lower than 600° C., it is difficult to produce the desired tin oxide whisker, or the calcination may require the longer time. When the calcination temperature exceeds 1500° C., the yield of the whisker may decrease.

The calcination time depends on the intended size of the tin oxide whisker, the concentration of halogen or hydrogen halide gas in the atmosphere gas, or the calcination temperature, and is not limited. The calcination time is preferably at least one minute, more preferably at least 10 minutes, and selected from a time range in which the desired tin oxide whisker is produced. As the calcination temperature rises, the calcination time is shortened.

A seed may be added to the raw material. When the raw material containing the seed is calcined, since the tin oxide whisker grows around the seed as a nuclei, the calcination temperature can be lower, the yield of the whisker can be higher and/or the calcination time can be shorter than those in the method using no seed.

A type of a calcination apparatus is not limited, and any type of a calcination furnace can be used. Preferably, the calcination furnace is made of a material which is not corroded by the halogen or hydrogen halide gas. More preferably, the furnace has a mechanism for adjusting a composition of the atmosphere gas.

Since an acidic gas such as the halogen or hydrogen halide gas is used, the calcination furnace has air tightness preferably. In the industrial production, the calcination is preferably carried out continuously. For example, a tunnel furnace, a rotary kiln or a pusher furnace can be used.

Since the reaction proceeds in the acidic atmosphere, as the container in which the raw material is filled for calcination, a crucible or a boat made of, for example, alumina, quartz, acid-resistant brick, graphite or a noble metal (e.g. platinum) is preferably used.

To produce the tin oxide whisker which is excellent in the electrical conductivity, it is preferred to add an oxide of a specific element such as antimony and bismuth to the raw material or the whisker. An amount of the dopant element is preferably from 1 to 20 wt. %, more preferably from 2 to 15 wt. % in terms of the oxide, based on the whole weight of the tin oxide whisker. Among the dopant elements, antimony is preferred. By the addition of the dopant, the tin oxide whisker having a resistivity of $10^2$ Ωcm, which is useful as the electrically conductive material, can be obtained.

To add the oxide of the dopant element, the oxide of the dopant element and/or a compound of the dopant element which can be converted to said oxide are/is mixed with the raw material tin oxide and/or the tin compound which can be converted to the tin oxide, and the mixture is calcined in the same manner as above.

Alternatively, after producing the tin oxide whisker containing no dopant element by the above described method, the oxide of the dopant element and/or the compound of the dopant element which can be converted to said oxide are/is mixed with the tin oxide whisker, and then the mixture is recalcined. The recalcination conditions may be the same as those in the above calcination.

As the oxide of the dopant element and the compound of the dopant element which can be converted to said oxide, antimony oxide and an antimony compound which can be converted to antimony oxide are preferred. Examples of the antimony compounds which can be converted to antimony oxide are those corresponding to the tin compound which can be converted to the tin oxide.

While the tin oxide whiskers may be weakly agglomerated depending on the kind of the raw material or the calcination conditions, a degree of agglomeration is weak, and they can be easily comminuted to obtain the intended tin oxide whisker containing no or few agglomerates.

Depending on the kind of the raw material or the calcination conditions, the produced tin oxide whisker may contain the unreacted raw material other than the intended tin oxide whisker. In such case, since an amount of the unreacted raw material is very small, the intended tin oxide whisker can be obtained by a simple separation method such as washing.

Since the tin oxide whisker of the present invention contains no or few agglomerates and has excellent dispersibility, it can be used as a tin oxide additive which is used in a dispersed state such as a filler or a pigment. Specifically, the tin oxide whisker of the present invention can be compounded in a paint or a plastic article as an antistatic filler, or in a transparent paint as a transparent electrically conductive material.

EXAMPLES

The present invention will be illustrated by the following Examples, which do not limit the scope of the present invention in any way.

In the Examples, the measurements were carried out as follows:

1. Shape of tin oxide whisker (length and thickness)

A scanning electron microscopic photograph of the tin oxide whisker was taken using a scanning electron microscope (T-300 manufactured by JOEL Co., Ltd. or S-800 or S-900 manufactured by HITACHI LTD.), and a length and a thickness (diameter) of the whisker were obtained from the photograph, and averaged with ten whiskers.

2. Crystalline phase of tin oxide whisker

The crystal phase of the tin oxide whisker was measured by the X-ray diffraction method (RAD-C manufactured by RIGAKU Co., Ltd.)

General procedures of the production method in the Examples were as follows:

A raw material powder was filled in an alumina or platinum container. A depth of the filled powder was 5 mm.

The calcination was carried out in a cylindrical furnace having a quartz or alumina muffle (manufactured by MOTOYAMA Co., Ltd.). With flowing the air or the nitrogen gas, temperature was raised at a heating rate of from 300° C./hr. to 600° C./hr., and when the temperature reached an atmosphere gas introduction temperature, the atmosphere gas was introduced.

A concentration of the atmosphere gas was adjusted by controlling gas flow rates by flow meters. The total pressure of the atmosphere was atmospheric pressure in all Examples.

After the temperature reached the predetermined temperature, the raw material powder was maintained at that temperature for a predetermined period of time. They will be referred to as "holding temperature" (calcination temperature) and "holding time" (calcination time). After the predetermined holding time, the powder was spontaneously cooled to obtain the intended tin oxide whisker.

Example 1

In a platinum container, metastannic acid powder (manufactured by NIPPN KAGAKU SANGYO Co., Ltd.) (1 g) was filled. Then, the container was set in the quartz muffle of the furnace and heated from room temperature at a heating rate of 450° C./hr. When the temperature reached 800° C., hydrogen chloride and air were flowed at flow rates of 30 ml/min. and 30 ml/min., respectively (50 vol. % of hydrogen chloride gas, about 10 vol. % of oxygen and about 40 vol. % of nitrogen), and the powder was calcined at 1100° C. for 30 minutes, followed by cooling to obtain tin oxide whisker.

FIG. 1 shows the X-ray diffraction pattern of the obtained tin oxide whisker. According to this analysis, the whisker obtained in this Example was found to have a rutile crystal form, and no other peak was found. Further, it was found that the crystal grew in the C-axis direction.

Figure 2:
FIG. 2 is a scanning electron microscopic photograph showing a crystal structure of the tin oxide whisker produced in Example 1.

As the result of the observation by the scanning electron microscope, the whisker had an average length of about 5 μm, an average thickness of about 0.05 μm, and an aspect ratio of about 100. FIG. 2 shows the scanning electron microscopic photograph of the obtained tin oxide whisker.

Figure 3:
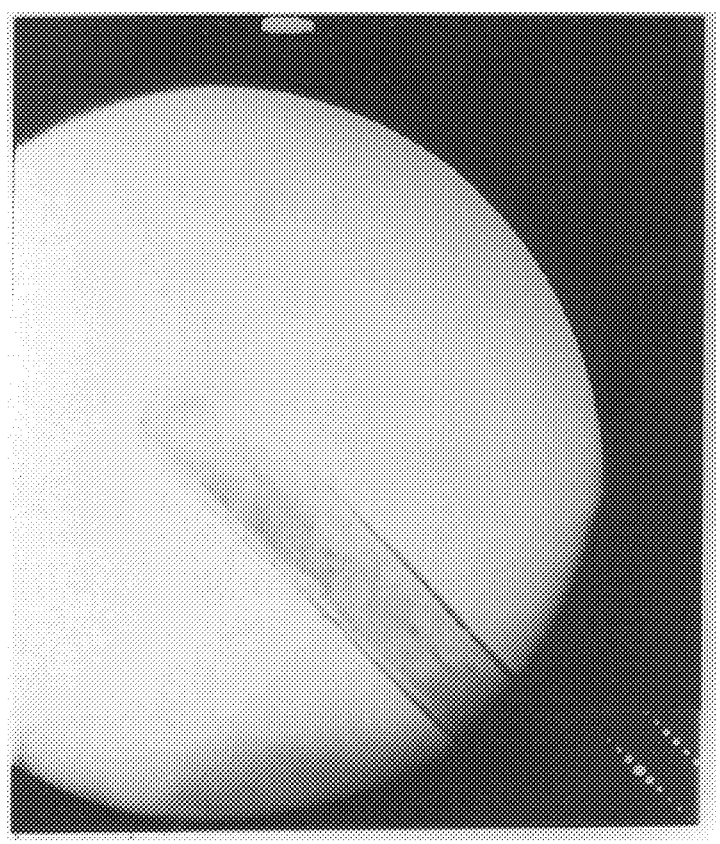
FIG. 3 is a transmission electron microscopic photograph and an electron diffraction photograph showing a crystal structure of the tin oxide whisker produced in Example 1.

Further, FIG. 3 shows the transmission electron microscopic photograph and the electron diffraction pattern of the obtained tin oxide whisker, which confirm that the whisker grew in the C-axis direction.

Example 2

In a ball mill, antimony oxide powder (manufactured by WAKO JUNYAKU Co., Ltd.) (6 g) and metastannic acid (manufactured by NIPPN KAGAKU SANGYO Co., Ltd.) (100 g) were mixed in ethanol and dried with a rotary evaporator. The mixed powder (1 g) was filled in a platinum container.

Then, the container was set in the quartz muffle of the furnace and heated from room temperature at a heating rate of 600° C./hr., and the mixed powder was calcined at 1000° C. for 180 minutes, while flowing hydrogen chloride gas and air at flow rates of 30 ml/min. and 70 ml/min., respectively. Thereafter, the calcined material was spontaneously cooled to obtain antimony-doped tin oxide whisker.

Figure 4:
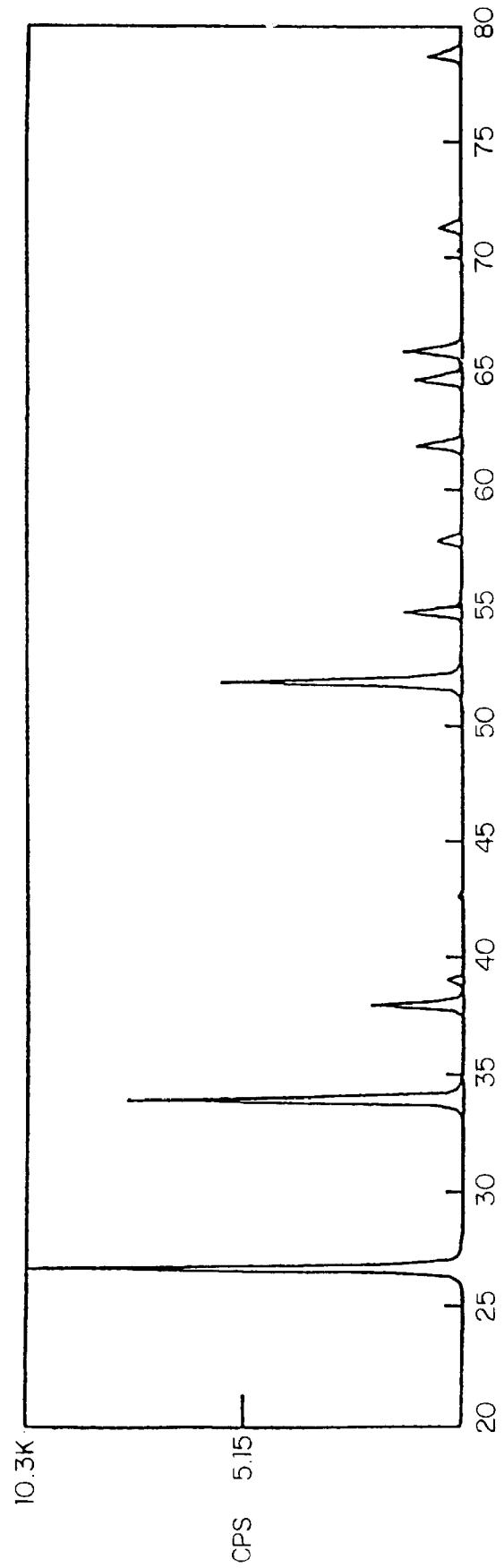
FIG. 4 is an X-ray diffraction pattern of tin oxide whisker produced in Example 2.

FIG. 4 shows the X-ray diffraction pattern of the obtained tin oxide whisker. According to this analysis, the whisker obtained in this Example was found to have a rutile crystal form, and no other peak was found.

As the result of the observation by the scanning electron microscope, the whisker had an average length of about 5

μm, an average thickness of about 0.05 μm, and an aspect ratio of about 100.

Example 3

In a platinum container, metal tin powder (manufactured by WAKO JUNYAKU Co., Ltd.) (1 g) was filled. Then, the container and a boat containing ammonium bromide (3 g) were set in the quartz muffle of the furnace and heated from room temperature at a heating rate of 600° C./hr. while flowing an air at a flow rate of 20 ml/min., and the metal tin powder was calcined at 1100° C. for 60 minutes while flowing the air at the same flow rate, followed by spontaneous cooling to obtain tin oxide whisker.

From an X-ray diffraction pattern, the tin oxide whisker obtained in this Example was found to have a rutile crystal form, and no other peak was found.

As the result of the observation by the scanning electron microscope, the whisker had an average length of about 1 μm, an average thickness of about 0.02 μm, and an aspect ratio of about 50.

Comparative Example 1

In a platinum container, 1 g of the same metastannic acid powder as that used in Example 1 was filled. Then, the container was set in the quartz muffle of the furnace and heated from room temperature at a heating rate of 600° C./hr. while flowing an air at a flow rate of 30 ml/min., and the metal tin powder was calcined at 1100° C. for 90 minutes while flowing the air at the same flow rate, followed by spontaneous cooling to obtain tin oxide powder.

From an X-ray diffraction pattern, the tin oxide whisker obtained in this Example was found to have a rutile crystal form.

Figure 5:
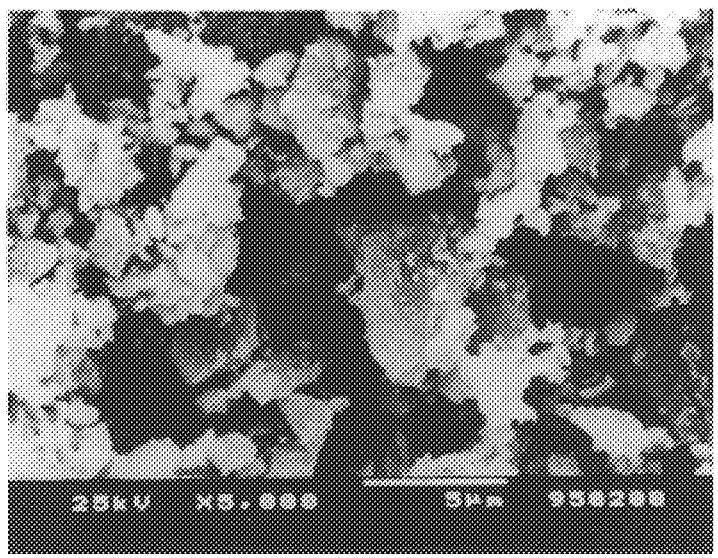
FIG. 5 is a scanning electron microscopic photograph showing a crystal structure of the tin oxide whisker produced in Comparative Example 1.

As the result of the observation by the scanning electron microscope, the whisker was isotropic, and had an average particle size of about 0.3 μm. The electron microscopic photograph of the tin oxide powder is shown in FIG. 5, which confirmed that the powder was crystallized, but no whisker was formed.

What is claimed is:

1. A tin oxide whisker having a length of 0.1 to 100 μm, a thickness of 0.005 to 5 μm, and a ratio of the length to the thickness of at least 5.

2. A tin oxide according to claim 1, which is a crystal grown in a C-axis of the crystal.

3. A tin oxide whisker according to claim 1, which contains 1 to 20 wt. % (in terms of an oxide) of at least one dopant selected from the group consisting of antimony and bismuth based on the weight of the whisker.

4. A tin oxide according to claim 3, which is a crystal grown in a C-axis of the crystal.

* * * * *